(12) United States Patent
Bauchot et al.

(10) Patent No.: US 8,081,076 B2
(45) Date of Patent: Dec. 20, 2011

(54) METHOD AND APPARATUS FOR VISUALLY LOCATING SHORT DISTANCE EMISSION RFID TAGS TO LOCATE ITEMS IN A CONTAINER

(75) Inventors: Frederic Bauchot, Saint-Jeannet (FR); Gerard Marmigere, Drap (FR); Joaquin Picon, St. Laurent du Var (FR); Xavier Rey-Robert, La Gaude (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 12/267,749

(22) Filed: Nov. 10, 2008

(65) Prior Publication Data

US 2010/0097196 A1 Apr. 22, 2010

(30) Foreign Application Priority Data

Oct. 17, 2008 (EP) .................................. 08305696

(51) Int. Cl.
*G08B 13/14* (2006.01)
(52) U.S. Cl. ............... 340/572.1; 340/568.7; 340/539.1; 340/10.1
(58) Field of Classification Search .... 340/572.1–572.9, 340/568.1, 568.7, 505, 501, 10.1, 1.1, 539.1, 340/531, 5.61, 5.6, 5.2, 5.1, 539.32
See application file for complete search history.

(56) References Cited

U.S. PATENT DOCUMENTS

| | | | |
|---|---|---|---|
| 4,226,357 A * | 10/1980 | Martin .................... | 229/120.26 |
| 6,237,772 B1 | 5/2001 | LaMarche et al. | |
| 7,030,731 B2 * | 4/2006 | Lastinger et al. ............ | 340/10.1 |
| 7,098,794 B2 | 8/2006 | Lindsay et al. | |
| 7,212,121 B2 | 5/2007 | Hashimoto | |
| 7,286,043 B2 | 10/2007 | Carrender et al. | |
| 7,504,949 B1 | 3/2009 | Rouaix et al. | |
| 7,639,119 B2 | 12/2009 | Carrender et al. | |
| 7,768,409 B2 | 8/2010 | Parias | |
| 7,812,719 B2 | 10/2010 | Djuric et al. | |
| 2002/0196126 A1 * | 12/2002 | Eisenberg et al. ............ | 340/10.2 |
| 2003/0227385 A1 * | 12/2003 | Lancaster ................. | 340/572.1 |
| 2004/0212480 A1 * | 10/2004 | Carrender et al. ......... | 340/10.42 |
| 2005/0275531 A1 | 12/2005 | Johnson | |

(Continued)

OTHER PUBLICATIONS

Trieu, U.S. Appl. No. 12/267,830, Office Action Communication, FR920080198US1, Dec. 9, 2010, 13 pages.

(Continued)

*Primary Examiner* — Daniel Previl
(74) *Attorney, Agent, or Firm* — Douglas Lashmit; Hoffman Warnick LLC

(57) ABSTRACT

The present invention is directed to a method and apparatus for visually locating short distance emission RFID tags to locate items in a container. A method in accordance with an embodiment of the present invention includes: initiating a reading sequence of a plurality of first RFID tags, wherein each first RFID tag is associated with a respective item located in the container, and wherein each first RFID tag emits an identification (ID); capturing the ID emitted by each first RFID tag using a plurality of second RFID tags located in the container, wherein each second RFID tag is coupled to a respective illumination source; addressing one of the first RFID tags; and activating the illumination source coupled to each second RFID tag that captured the ID of the addressed first RFID tag.

15 Claims, 4 Drawing Sheets

U.S. PATENT DOCUMENTS

| | | | |
|---|---|---|---|
| 2006/0022038 | A1 | 2/2006 | Hewlin et al. |
| 2008/0303682 | A1* | 12/2008 | Han .......................... 340/686.1 |
| 2009/0102661 | A1 | 4/2009 | Barnes et al. |
| 2009/0322486 | A1* | 12/2009 | Gerstel ........................ 340/10.1 |
| 2010/0030667 | A1 | 2/2010 | Chudy et al. |

OTHER PUBLICATIONS

Trieu, U.S. Appl. No. 12/267,712, Office Action Communication, FR920080141US1, Dec. 20, 2010, 16 pages.

Trieu, Van Thanh, U.S. Appl. No. 12/267,830, Notice of Allowance & Fees Due, FR920080198US1, Apr. 8, 2011, 11 pages.

Trieu, Van Thanh, U.S. Appl. No. 12/267,712, Office Action Communication, FR920080141US1, Apr. 20, 2011, 12 pages.

Trieu, U.S. Appl. No. 12/267,830, Supplemental Notice of Allowability, FR920080198US1, May 4, 2011, 2 pages.

Van Thanh Tried, PTO Final Office Action, U.S. Appl. No. 12/267,712, Notification Date Jul. 27, 2011, 14 pages.

Trieu, U.S. Appl. No. 12/267,830, Supplemental Notice of Allowability, Jun. 3, 2011, 4 pages.

Trieu, U.S. Appl. No. 12/267,712, Notice of Allowance & Fees Due, 8 pages.

\* cited by examiner

METHOD AND APPARATUS FOR VISUALLY LOCATING SHORT DISTANCE EMISSION RFID TAGS TO LOCATE ITEMS IN A CONTAINER

CROSS-REFERENCE TO RELATED APPLICATIONS

This application is related in some aspects to co-pending patent application Ser. No. 12/267,712, filed Nov. 10, 2008, entitled "Method and Apparatus for Reading Short Distance Emission RFID Tags to Locate Items in a Container," and co-pending patent application Ser. No. 12/267,830, filed Nov. 10, 2008, entitled "RFID Tag Positional Addressing," which are hereby incorporated by reference.

FIELD OF THE INVENTION

The present invention relates to radio frequency identification (RFID) tags. More specifically, the present invention is directed to a method and apparatus for visually locating short distance emission RFID tags to locate items in a container.

BACKGROUND OF THE INVENTION

In several industries, product items may be equipped with an RFID tag. When the item is relatively small, the size of the RFID tag must be adapted and becomes very small itself. One consequence of its small size is a small emission distance, which makes it difficult to read the information in the RFID tag. When a plurality of such items are stored together in a compartmentalized manner, it is difficult to determine in which compartment a given item has been stored such that it can be easily located and retrieved.

SUMMARY OF THE INVENTION

The present invention is directed to a method and apparatus for visually locating short distance emission RFID tags to locate items in a container.

A first aspect of the present invention is directed to a method for visually locating short distance emission RFID tags to locate items in a container, comprising: initiating a reading sequence of a plurality of first RFID tags, wherein each first RFID tag is associated with a respective item located in the container, and wherein each first RFID tag emits an identification (ID); capturing the ID emitted by each first RFID tag using a plurality of second RFID tags located in the container, wherein each second RFID tag is coupled to a respective illumination source; addressing one of the first RFID tags; and activating the illumination source coupled to each second RFID tag that captured the ID of the addressed first RFID tag.

A second aspect of the present invention is directed to a system for visually locating short distance emission RFID tags to locate items in a container, comprising: an RFID reader for initiating a reading sequence of a plurality of first RFID tags, wherein each first RFID tag is associated with a respective item located in the container, and wherein each first RFID tag emits an identification (ID); a plurality of second RFID tags located in the container for capturing the ID emitted by each first RFID tag, wherein each second RFID tag is coupled to a respective illumination source; the RFID reader addressing one of the first RFID tags; and a system for activating the illumination source coupled to each second RFID tag that captured the ID of the first RFID tag addressed by the RFID reader.

A third aspect of the present invention is directed to a container, comprising: a plurality of compartments, each compartment comprising a plurality of faces; and an RFID tag and an associated illumination source provided on each face of each compartment.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
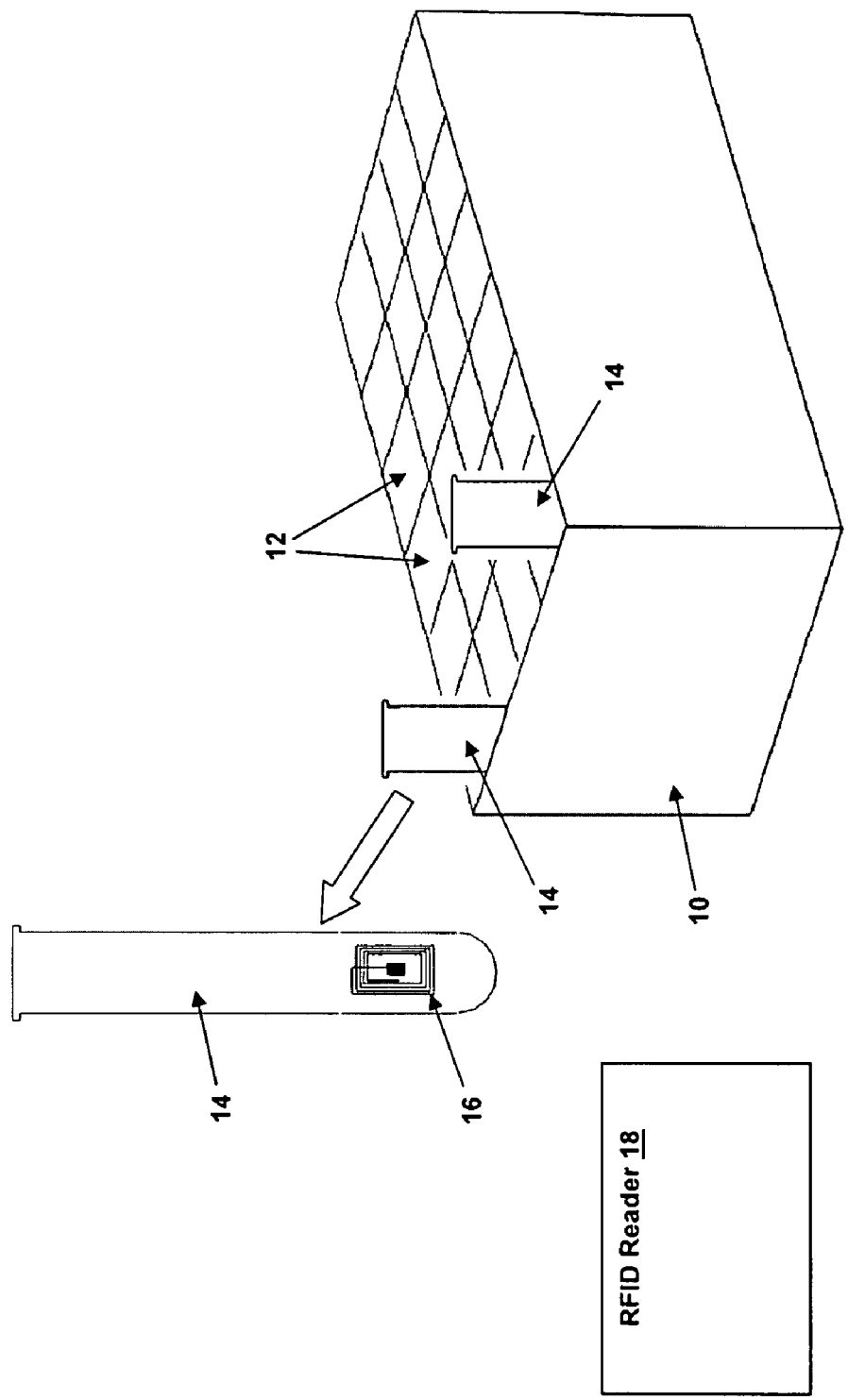
FIG. 1 depicts a system for visually locating short distance emission RFID tags to locate items in a container in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to a method and apparatus for visually locating short distance emission RFID tags to locate items in a container.

As depicted in FIG. 1, a container 10 (e.g., a box) is divided into a plurality of compartments 12 (e.g., rectangular in shape) in which items 14 are stored. In this example, the items 14 comprise small test tubes containing samples, while the container 10 and the compartments 12 are rectangular in shape. However, it will be apparent to one skilled in the art that the present invention can be applied in any type of environment to any type of container containing any type of items.

Each item 14 is equipped with an RFID tag 16 that has a very short emission range. To this extent, the emission range is not sufficient to allow an RFID reader 18 to read a given RFID tag 16 without moving the antenna of the RFID reader 18 in the vicinity of the RFID tag 16. The RFID tags 16 can be provided on the items 14 using any now known or later developed methodology.

Figure 2:
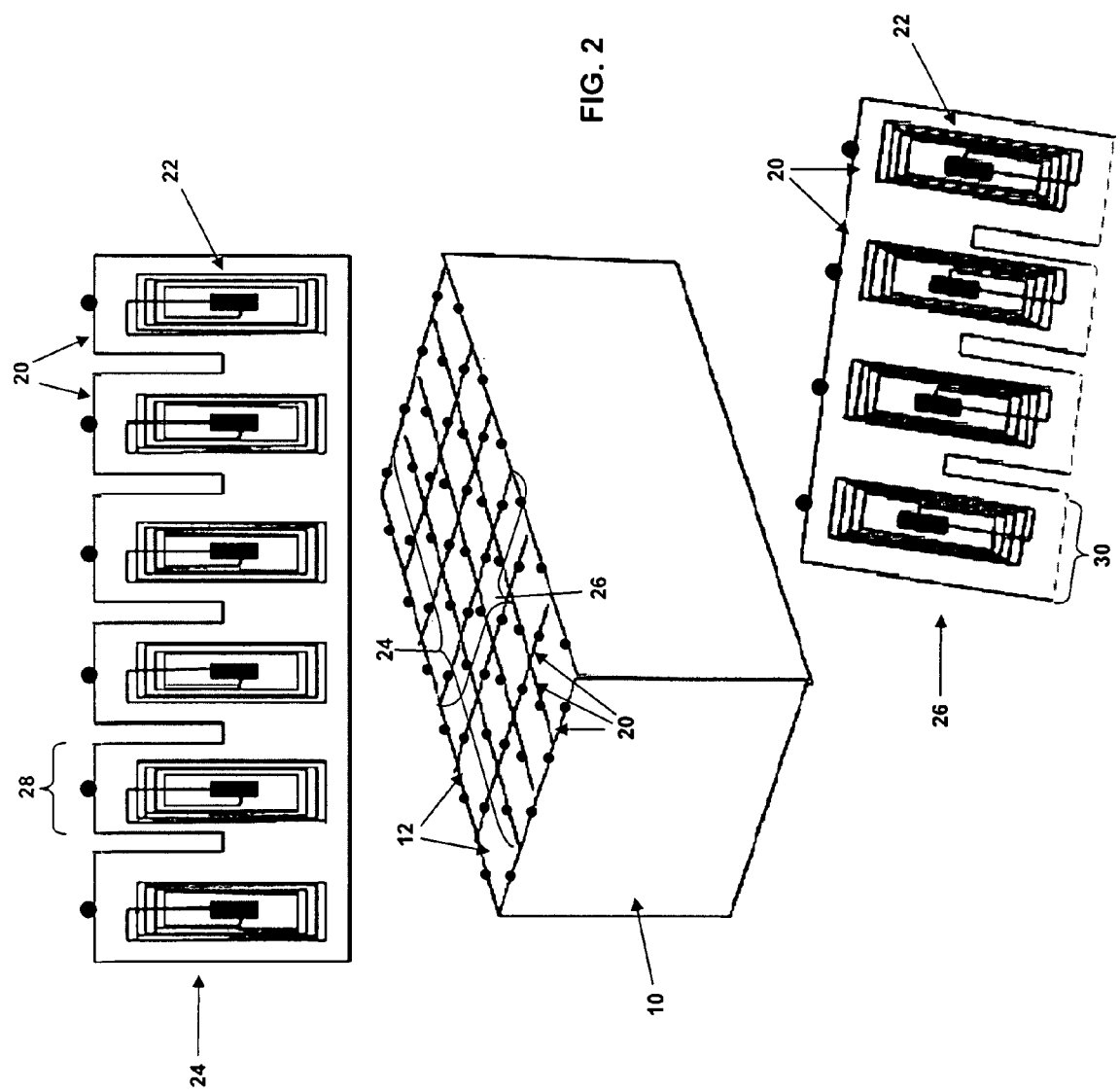
FIG. 2 depicts an illustrative container in accordance with an embodiment of the present invention.

As depicted in FIG. 2, each compartment 12 of the container 10 has a plurality of faces 20. The faces 20 of the compartments 12 are equipped with RFID tags 22. Unlike the RFID tags 16, however, the RFID tags 22 have a larger emission range that is sufficient to allow the RFID reader 18 to read the RFID tags 22. The RFID tags 22 can be provided on the faces 20 of the compartments 12 using any now known or later developed methodology In this embodiment, the compartments 12 are formed using a plurality of first and second dividers 24, 26, wherein the first dividers 24 comprise a plurality of fingers 28, while the second dividers 26 comprise a plurality of fingers 30. When the first and second dividers 24, 26 are positioned in the container 10, the plurality of fingers 28, 30 form the faces 20 of the compartments 12. An RFID tag 22 is provided on one side of each finger 28, 30. Other techniques for forming the compartments 12 are within the purview of one skilled in the art.

Each face 20 of each compartment 12 of the container 10 includes an illumination source (e.g., a light emitting diode (LED) 32), which is electrically coupled to the RFID tag 22 associated with the face 20. The LEDs 32 are located at or near the top of the faces 20 such that the LEDs 32 are visible when a user views the container 10. Other suitable illumination sources can be also be used in the practice of the present invention.

The identities and locations of the RFID tags 22 are known and can be used to determine the physical location of items 14 stored in the container 10. When the RFID reader 18 starts a reading sequence, each RFID tag 16 answers. The response from a given RFID tag 16 on an item 14, which includes an ID of the RFID tag 16, is not received by the RFID reader 18, but is captured and stored by the RFID tags 22 located around the item 14 in the container 10. When the RFID reader 18 subsequently addresses one of the RFID tags 16 (e.g., using a high-frequency protocol), each RFID tag 22 in the container 10 examines its list of captured IDs of nearby RFID tags 16. If the addressed RFID tag 16 is in the list of IDs captured by an RFID tag 22, the RFID tag 22 powers and illuminates the LED 32 to which it is electrically coupled. In this manner, the LEDs 32 surrounding the compartment 12 in which the addressed RFID tag 16 is (or was) stored can be easily located. This process is described in further detail below.

In accordance with an embodiment of the present invention, this reading process occurs in two phases. In a first phase, the RFID tags 16 are powered by the RFID reader 18, and emit their IDs at a random pace in a given period. During this phase, the RFID tags 22 listen to and capture the IDs emitted by the RFID tags 16. In a second phase, the RFID reader 18 addresses one of the RFID tags 16. In response, each RFID tag 22 in the container 10 examines its list of captured IDs of nearby RFID tags 16. If the addressed RFID tag 16 is in the list of IDs captured by an RFID tag 22, the LED 32 coupled to that RFID 22 is illuminated.

Figure 3:
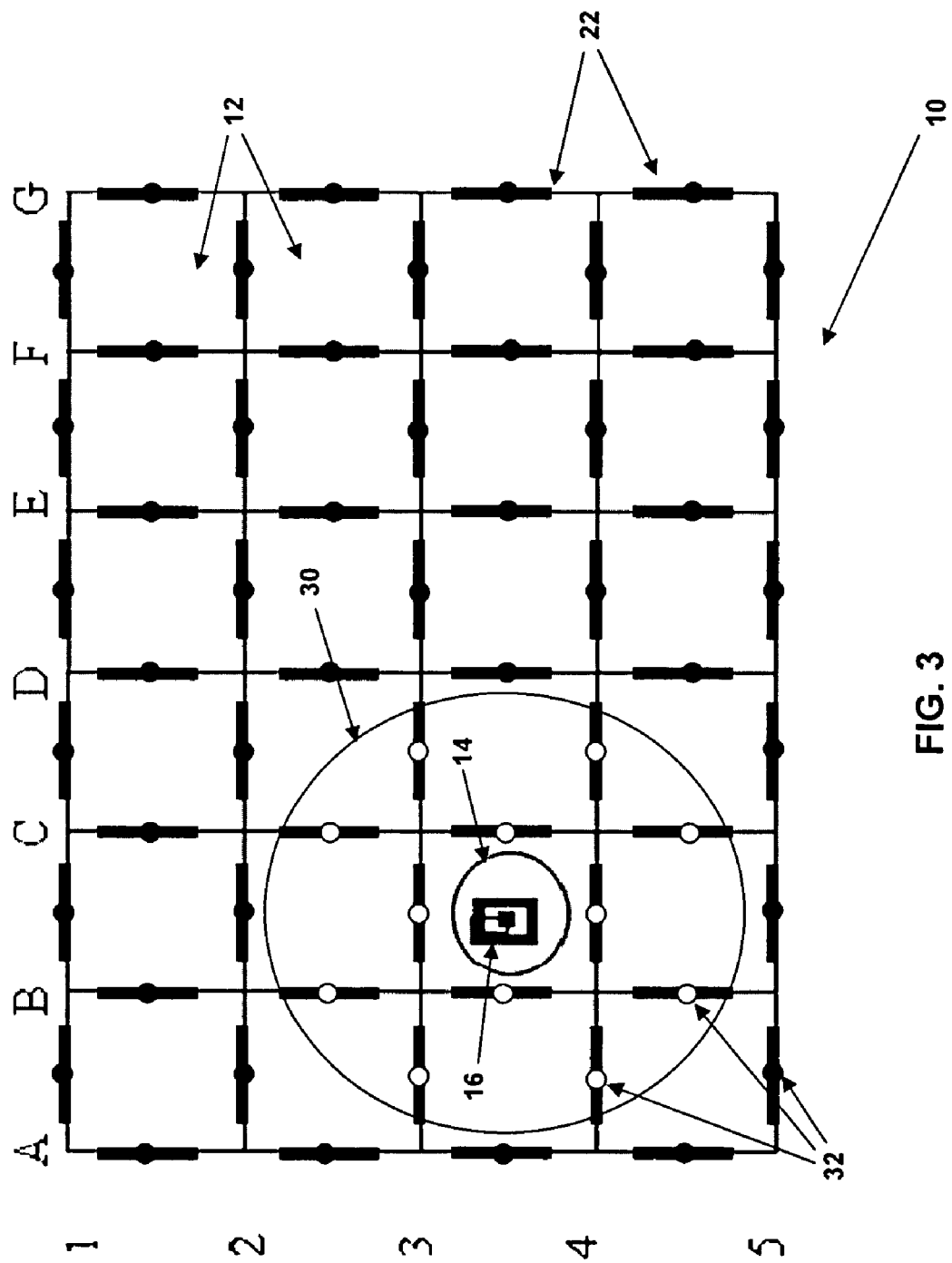
FIG. 3 depicts a plan view of the container of FIG. 2, in accordance with an embodiment of the present invention.

A plan view of a container 10 is depicted in FIG. 3. As shown, the portions (e.g., sides/dividers) of the container 10 extending vertically in FIG. 3 are labeled using the letters A, B, C, . . . , while the portions (e.g., sides/dividers) of the container 10 extending horizontally in FIG. 3 are labeled using the numbers 1, 2, 3, . . . . Each RFID tag 22 located on a horizontally-extending portion of the container 10 is named using the line number associated with that portion, followed by the two letters of the vertically-extending portions that enclose the RFID tag 22. For instance, the RFID tag 22 located on the horizontally-extending portion designated "1" between the vertically-extending portions designated "A" and "B", is named "1AB". In a similar manner, each RFID tag 22 located on a vertically-extending portion of the container 10 is named using the letter associated with that portion, followed by the two numbers of the horizontally-extending portions that enclose the RFID tag 22. For instance, the RFID tag 22 located on the vertically-extending portion designated "A" between the horizontally-extending portions designated "2" and "3", is named "A23". Based on this naming convention, the RFID tag 16 on an item 14 in the container 10 is identified by the two letters and two numbers of the portions of the container 10 that enclose the item 14. For example, the item 14 shown in the container 10 in FIG. 3 is identified as "BC34".

FIG. 3 depicts an item 14 in the container 10 with an RFID tag 16 identified as BC34 emitting a signal, which has a low range of coverage 30. The RFID tags 22 designated B23, C23, 3AB, 3BC, 3CD, B34, C34, 4AB, 4BC, 4CD, B45 and C45 are within the range of coverage 30 of the RFID tag 16 and receive the signal emitted by, and store the ID of, the RFID tag 16 identified as BC34. When the RFID reader 18 subsequently addresses the RFID tag 16 identified as BC34, the LEDs 32 coupled to the RFID tags B23, C23, 3AB, 3BC, 3CD, B34, C34, 4AB, 4BC, 4CD, B45 and C45 are illuminated as indicated by the "white" LEDs 32 in FIG. 3. To this extent, a user can easily locate in the container 10 the item 14 associated with the RFID tag 16 identified as BC34 based on the illuminated LEDs 32. Further, if the item 14 in the container 10 with the RFID tag 16 identified as BC34 is removed from the container 10, and the RFID reader 18 again addresses the RFID tag 16 BC34, the LEDs 32 coupled to the RFID tags B23, C23, 3AB, 3BC, 3CD, B34, C34, 4AB, 4BC, 4CD, B45 and C45 are again illuminated. In this way, a user can identify the location where the item 14 was located in the container 10, in order to return the item to the same location in the container 10. This assumes, however, that the first phase of the reading process is not repeated in the meanwhile. A "reset"-type command can be used to clear the list of IDs stored by the RFID tags 22.

Figure 4:
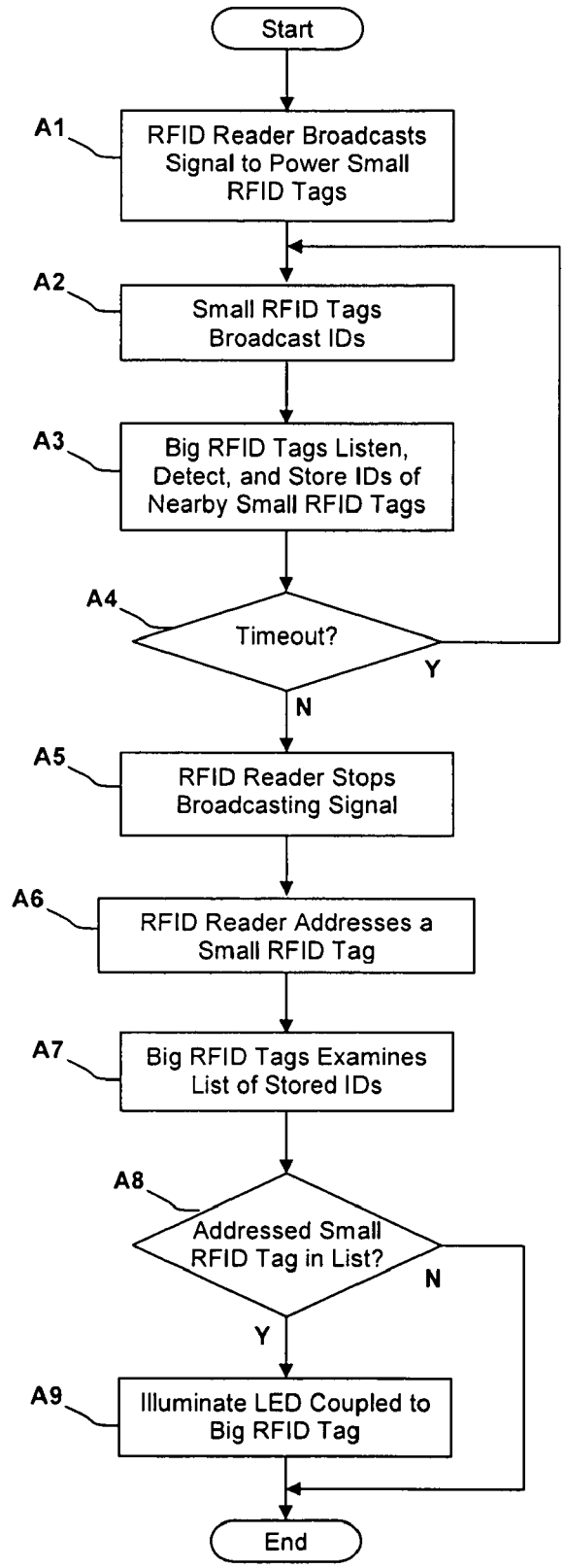
FIG. 4 depicts an illustrative process in accordance with an embodiment of the present invention.

A flow diagram of an illustrative process in accordance with an embodiment of the present invention is depicted in FIG. 4. At A1, the RFID reader 18 broadcasts a first signal to provide power to the RFID tags 16 ("Small RFID tags" in FIG. 4) located on the items 14 in the container 10. At A2, the RFID tags 16 broadcast their IDs. At A3, the RFID tags 22 ("Big RFID tags" in FIG. 4) listen, detect, and store the IDs of nearby RFID tags 16. If a timout occurs (YES, A4), flow returns to A2. If a timeout does not occur (NO, A4), flow passes to A5. At A5, the RFID reader 18 stops broadcasting the first signal. At A6, the RFID reader 18 addresses one of the RFID tags 16. In response, at A7, each RFID tag 22 in the container 10 examines its list of captured IDs of nearby RFID tags 16. If the addressed RFID tag 16 is in the list of IDs captured by an RFID tag 22 (YES, A8), the LED 32 coupled to that RFID 22 is illuminated at A9. If the addressed RFID tag 16 is not in the list of IDs captured by an RFID tag 22 (No, A8), no action is taken.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method for visually locating short distance emission RFID tags to locate items in a container, the container comprising a plurality of rectangular compartments, each compartment comprising a plurality of faces, comprising:

initiating a reading sequence of a plurality of first RFID tags, each first RFID tag attached to a respective item located in a respective compartment of the container, and wherein each first RFID tag emits an identification (ID);

capturing the ID emitted by each first RFID tag using a plurality of second RFID tags located in the container, each second RFID tag coupled to a respective illumination source, wherein the compartments are formed by a plurality of interlocking dividers, wherein each divider comprises a plurality of fingers, wherein the fingers form the faces of the compartments, and wherein each face of each compartment includes one of the second RFID tags and the respective coupled illumination source;

addressing one of the first RFID tags; and activating the illumination source coupled to each second RFID tag having captured the ID of the addressed first RFID tag.

2. The method of claim 1, wherein the initiating and addressing are performed by an RFID reader.

3. The method of claim 1, wherein a location of the item associated with the addressed first RFID tag is indicated by the activated illumination sources.

4. The method of claim 1, wherein the illumination source comprises a light emitting diode (LED).

5. The method of claim 1, wherein the IDs emitted by the first RFID tags are not captured.

6. The method of claim 1, wherein the second RFID tags have a larger emission range than the first RFID tags.

7. The method of claim 1, further comprising:
  removing from the container the item associated with the addressed first RFID tag;
   addressing the first RFID tag associated with the removed item; and
   activating the illumination source coupled to each second RFID tag that captured the ID of the addressed first RFID tag.

8. The method of claim 7, wherein a location in the container from which the item was removed is indicated by the activated illumination sources.

9. The method of claim 8, further comprising:
  replacing the removed item in the location in the container indicated by the activated illumination sources.

10. The method according to claim 1, further comprising:
  resetting the second RFID tags to clear captured IDs of the first RFID tags.

11. A system for visually locating short distance emission RFID tags to locate items in a container, the container comprising a plurality of rectangular compartments, each compartment comprising a plurality of faces, comprising:
  an RFID reader for initiating a reading sequence of a plurality of first RFID tags, each first RFID tag attached to a respective item located in a respective compartment of the container, and wherein each first RFID tag emits an identification (ID);
  a plurality of second RFID tags located in the container for capturing the ID emitted by each first RFID tag, each second RFID tag coupled to a respective illumination source, wherein the compartments are formed by a plurality of interlocking dividers, wherein each divider comprises a plurality of fingers, wherein the fingers form the faces of the compartments, and wherein each face of each compartment includes one of the second RFID tags and the respective coupled illumination source;
  the RFID reader addressing one of the first RFID tags; and
  a system for activating the illumination source coupled to each second RFID tag having captured the ID of the first RFID tag addressed by the RFID reader.

12. The system of claim 11, wherein the illumination source comprises a light emitting diode (LED).

13. The system of claim 11, wherein the IDs emitted by the first RFID tags are not captured by the RFID reader.

14. The system of claim 11, wherein the second RFID tags have a larger emission range than the first RFID tags.

15. A container, comprising:
  a box;
  a plurality of rectangular compartments formed within the box, each rectangular compartment comprising a plurality of faces;
  a plurality of interlocking dividers for forming the rectangular compartments, wherein each divider comprises a plurality of fingers, and wherein the fingers form the faces of the compartments; and
  a plurality of RFID tags and a plurality of associated illumination sources, wherein an RFID tag and an associated illumination source is provided on every face of every compartment to provide an X-Y matrix of illumination sources for visually indicating a location of an object stored in one of the rectangular compartments of the container.

* * * * *